United States Patent
Algreatly

(10) Patent No.: US 9,696,842 B2
(45) Date of Patent: Jul. 4, 2017

(54) THREE-DIMENSIONAL CUBE TOUCHSCREEN WITH DATABASE

(71) Applicant: Cherif Atia Algreatly, Newark, CA (US)

(72) Inventor: Cherif Atia Algreatly, Newark, CA (US)

(73) Assignee: Cherif Algreatly, Palo Alto, CA (US)

( * ) Notice: Subject to any disclaimer, the term of this patent is extended or adjusted under 35 U.S.C. 154(b) by 441 days.

(21) Appl. No.: 14/157,499

(22) Filed: Jan. 16, 2014

(65) Prior Publication Data

US 2015/0199063 A1 Jul. 16, 2015

(51) Int. Cl.
*G06F 3/041* (2006.01)
*G06F 3/0481* (2013.01)
*H04N 5/232* (2006.01)
*G06F 3/0488* (2013.01)

(52) U.S. Cl.
CPC ........ *G06F 3/0416* (2013.01); *G06F 3/04815* (2013.01); *G06F 3/04883* (2013.01); *H04N 5/23216* (2013.01); *H04N 5/23296* (2013.01)

(58) Field of Classification Search
CPC ............... G06F 3/0416; G06F 3/04815; G06F 3/04883; H04N 5/23216; H04N 5/23296
See application file for complete search history.

(56) References Cited

U.S. PATENT DOCUMENTS

| | | | | |
|---|---|---|---|---|
| 4,839,838 A * | 6/1989 | LaBiche | ............ | G01P 15/0888 345/157 |
| 5,729,249 A * | 3/1998 | Yasutake | ............... | G06F 3/0338 345/157 |
| 5,740,328 A * | 4/1998 | Ravani | .................. | B25J 9/1692 318/568.16 |
| 6,278,418 B1 * | 8/2001 | Doi | ........................ | G09G 3/003 345/156 |
| 6,421,048 B1 * | 7/2002 | Shih | ........................ | G06F 3/016 345/419 |
| 6,597,347 B1 * | 7/2003 | Yasutake | ............... | G06F 3/0338 178/18.01 |
| 7,330,198 B2 * | 2/2008 | Yamaguchi | ......... | G06F 3/04845 345/650 |
| 7,862,415 B1 * | 1/2011 | Ghaly | .................... | A63F 9/0613 463/9 |
| 8,178,810 B2 * | 5/2012 | Ratner | .................. | H03K 17/962 200/600 |
| 8,405,680 B1 * | 3/2013 | Cardoso Lopes | ....... | G06T 15/50 345/426 |
| 2001/0022665 A1* | 9/2001 | Yajima | ............... | H04N 1/00209 358/1.13 |
| 2001/0050691 A1* | 12/2001 | Komata | ................ | G06F 3/0481 345/667 |
| 2002/0181751 A1* | 12/2002 | Hale | ........................ | G06T 17/20 382/128 |

(Continued)

*Primary Examiner* — Jay Patel
*Assistant Examiner* — Joseph Suh

(57) ABSTRACT

A display system that detects the point of touch and three-dimensional direction of a pressure exerted by an object on a surface to select a corresponding spot on a real object. The system is comprised of a touching cube, a plurality of sensors attached to the touching cube, a microprocessor that receives the output of the plurality of sensors, a database, and a presentation unit that highlights a spot on the real object corresponding to the point of touch and three-dimensional direction.

18 Claims, 12 Drawing Sheets

(56) References Cited

U.S. PATENT DOCUMENTS

| Publication No. | Date | Inventor | Classification | Subclass |
|---|---|---|---|---|
| 2003/0218802 A1* | 11/2003 | Kitabayashi | G02B 27/283 | 359/489.09 |
| 2004/0187602 A1* | 9/2004 | Okada | G01L 5/165 | 73/862.042 |
| 2004/0205695 A1* | 10/2004 | Fletcher | G06F 8/20 | 717/105 |
| 2005/0029979 A1* | 2/2005 | Lee | B25J 13/085 | 318/568.12 |
| 2005/0093862 A1* | 5/2005 | Boier-Martin | G06T 17/20 | 345/420 |
| 2005/0273778 A1* | 12/2005 | Bixler | G06F 9/4446 | 717/165 |
| 2006/0267952 A1* | 11/2006 | Alcorn | A47B 21/007 | 345/173 |
| 2007/0238981 A1* | 10/2007 | Zhu | A61B 90/36 | 600/424 |
| 2007/0242066 A1* | 10/2007 | Levy Rosenthal | H04N 5/272 | 345/419 |
| 2008/0074650 A1* | 3/2008 | Fujihara | B81C 99/005 | 356/152.2 |
| 2008/0100586 A1* | 5/2008 | Smart | G06F 3/0418 | 345/173 |
| 2009/0002335 A1* | 1/2009 | Chaudhri | G06F 3/04815 | 345/173 |
| 2010/0117993 A1* | 5/2010 | Kent | G06F 3/0436 | 345/177 |
| 2010/0153890 A1* | 6/2010 | Wang | G06F 3/011 | 715/863 |
| 2010/0214242 A1* | 8/2010 | Casiez | G06F 3/038 | 345/173 |
| 2010/0261526 A1* | 10/2010 | Anderson | G06F 3/016 | 463/31 |
| 2011/0248939 A1* | 10/2011 | Woo | G06F 3/0416 | 345/173 |
| 2013/0060302 A1* | 3/2013 | Polefko | A61N 1/36017 | 607/46 |
| 2013/0141360 A1* | 6/2013 | Compton | G06F 1/1632 | 345/173 |
| 2013/0229387 A1* | 9/2013 | Chen | G06F 3/042 | 345/175 |
| 2013/0342468 A1* | 12/2013 | Hekstra | G06F 3/0418 | 345/173 |
| 2014/0027503 A1* | 1/2014 | Kennedy | G06F 17/30265 | 235/375 |
| 2014/0028606 A1* | 1/2014 | Giannetta | G06F 3/04886 | 345/174 |
| 2014/0092029 A1* | 4/2014 | Nguyen | G06F 1/163 | 345/173 |
| 2015/0227200 A1* | 8/2015 | Norieda | G06F 3/041 | 345/173 |

* cited by examiner

THREE-DIMENSIONAL CUBE TOUCHSCREEN WITH DATABASE

CROSS-REFERENCE TO RELATED APPLICATION

This application is a continuation-in-part of a U.S. patent application Ser. No. 12/587,339, filed Oct. 6, 2009, titled "Touch Sensing Technology".

BACKGROUND

The virtual 3D objects presented on the computer display are an illusion of a two-dimensional projection. Selecting a certain point on one of the virtual 3D objects is achieved by selecting a spot on the computer display associated with a certain point of the virtual 3D objects. Taking into consideration the 3D location of each point on the virtual 3D objects, the position of the virtual camera of the computer, and the position of spot selected on the computer display, determines which point on the 3D objects is selected. This process or technique is utilized in most three-dimensional computer applications.

In many cases, the aforementioned process or technique cannot be utilized. For example, when viewing real 3D objects through a transparent surface, the location of the real 3D objects is unknown, and the position of the user's point of view is also unknown. Accordingly, there is no way that touching a spot on the transparent surface leads to selecting a corresponding point on the real 3D objects. This problem applies when using a head mounted display (HMD) in the form of eye glasses such as GOOGLE GLASS or the like. This problem occurs when using a modern digital camera when presenting a scene in front of the camera, on the camera screen. Also the problem arises, when using a modern transparent computer screen, where real objects are located and can be seen from behind the transparent computer screen.

Generally there is a plain need for a solution that enables selecting or interacting with real 3D objects that can be seen through transparent surfaces or computer screens. This solution can improve the use of modern HMDs, digital cameras, and transparent computer screens when it comes to interacting with surrounding objects or environments.

SUMMARY

In one embodiment, the present invention discloses a three-dimensional touchscreen that enables the user to interact with real 3D objects located behind a transparent surface (such as eye glasses or a glass display) or located behind a modern transparent computer screen. Accordingly, the present invention opens the door to previously nonexistent visualization and computer applications for HMDs, digital cameras, and modern transparent computer.

Generally, the present invention discloses a display system that enables a touchscreen, that detects the point of touch and the three-dimensional direction of a force exerted from an object on a surface, to interact with a real object wherein the display system is comprised of

- a touching cube with six faces wherein each face of the six faces is a transparent surface wherein a real object can be seen through the transparent surface;
- a sensing unit that detects the simultaneous movements of the touching cube relative to the x-axis, the y-axis, and the z-axis when a force is exerted by an object at a point of touch on the touching cube;
- a microprocessor that receives the data of the simultaneous movements from the sensing unit to determine the point of touch and the three-dimensional direction;
- a database that associates each point of touch and three-dimensional direction with a corresponding spot on the real objects; and
- a presentation unit that highlights the spot of the real object that is corresponding to current point of touch and three-dimensional direction.

Generally, the above Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
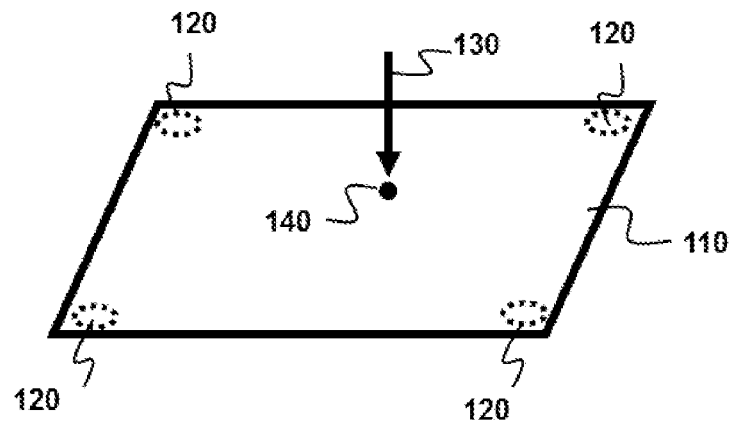
FIG. 1 illustrates a vertical force exerted on a surface connected to four force sensors that are positioned parallel to the surface plane.
Figure 2:
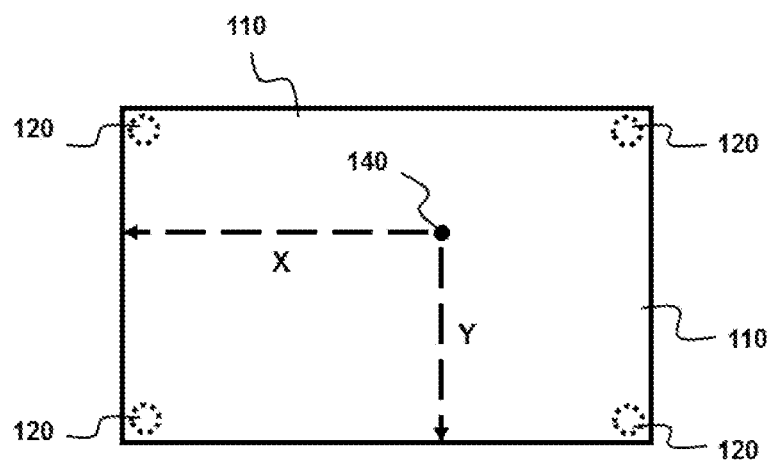
FIG. 2 illustrates the top view of the surface where the locations of the four force sensors and the force are shown in the figure.

To clarify the concept of the present invention, FIG. 1 illustrates a touch surface 110 which is a rectangular surface positioned to be parallel to the xy-plane on four force sensors 120 that are located beneath the four corners of the touch surface, where a vertical force 130 is exerted on the touch surface at a touch point 140. FIG. 2 illustrates a top view for the touch surface and the four force sensors of FIG. 1, where x and y represent the Cartesian coordinates of the touch point relative to an origin which is the left bottom corner of the touch surface.

The value of the vertical force can be computed by adding the four values of the four forces or reactions that are exerted at the positions of the four force sensors, whereas these four reactions represented by the output of the four force sensors. The position of the touch point can be computed by solving the equilibrium equations of the vertical force and the four reactions of the four force sensors as will be described subsequently. When the vertical force is moved on the touch surface the successive positions of the points of touch can be computed to represent the path of the vertical force movement on the touch surface. The vertical force can be any object that has a weight such as a user's finger, a pen, or the like.

Figure 3:
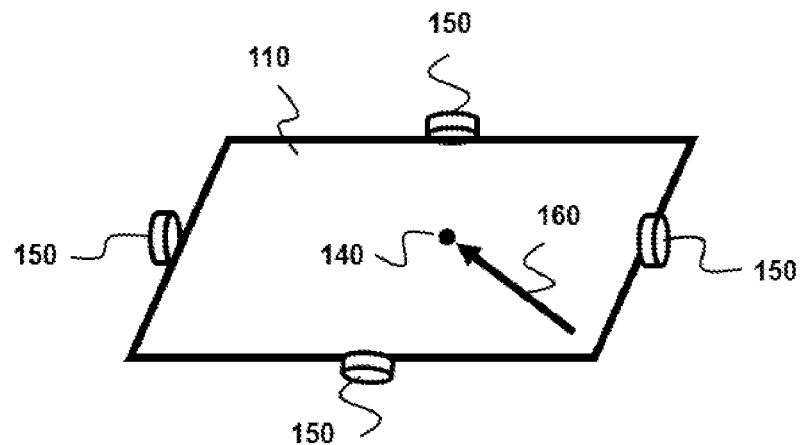
FIG. 3 illustrates a horizontal force exerted on a surface connected to four force sensors that are positioned perpendicular to the surface plane.
Figure 4:
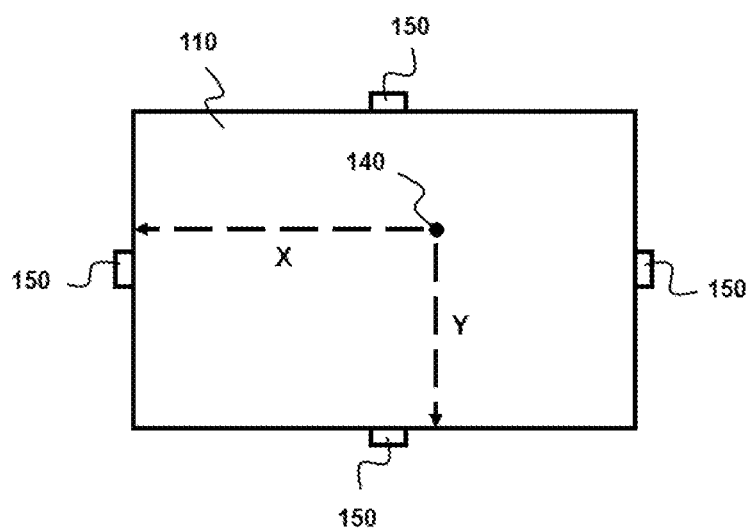
FIG. 4 illustrates the top view of the surface, where the locations of the four force sensors and the force are shown in the figure.

FIG. 3 illustrates another form of the present invention where the touch surface 110 is positioned between four force sensors 150 that are located at the middle points of the touch surface sides as shown in the figure, while a horizontal force 160 is exerted on the touch surface at the same touch point 140 of FIG. 1. FIG. 4 illustrates a top view for the touch surface and the four force sensors of FIG. 3, where x and y represent the Cartesian coordinates of the touch point relative to an origin which is the left bottom corner of the touch surface. Generally, the value of the horizontal force and its direction relative to the x-axis can be computed by analyzing the four forces that are exerted at the positions of the four force sensors, whereas these four force represented by the output of the four force sensors as will be described subsequently.

Figure 5:
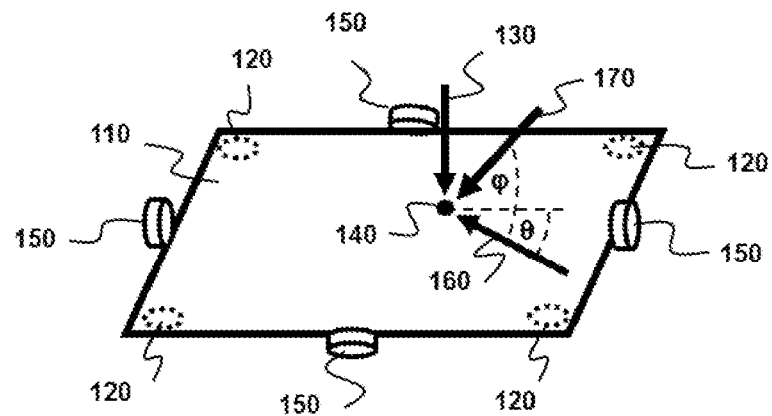
FIG. 5 illustrates a force in a three-dimensional direction exerted on a surface where four force sensors are positioned parallel to the surface plane, and another four force sensors are positioned perpendicular to the surface plane.
Figure 6:
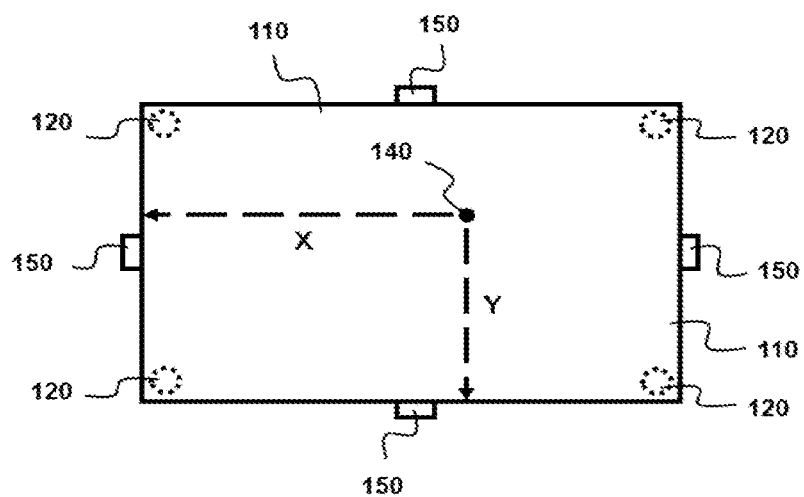
FIG. 6 illustrates the top view of the surface, where the locations of the eight force sensors and the force are shown in the figure.

FIG. 5 illustrates combining the elements of FIGS. 1 and 3 together to present the touch surface, the four touch sensors 120 that are positioned vertically beneath the touch surface corners, and the four touch sensors 150 that are positioned horizontally at the middle points of the touch surface sides. The vertical force 130 and the horizontal force 160 can be combined into one resultant force 170 that touches the touch surface at the same touch point 140. As shown in the figure, $\theta$ represents the angle between the positive x-axis and a line representing the projection of the resultant force on the xy-plan; while $\phi$ represents the angle between the resultant force and the xy-plane. FIG. 6 illustrates a top view for the elements of FIG. 5. Generally, the values of the vertical force, the horizontal force, and the resultant force, in addition to, the values of $\theta$, $\phi$, x, and y can be computed using a specific algorithm as will be described subsequently.

Figure 7:
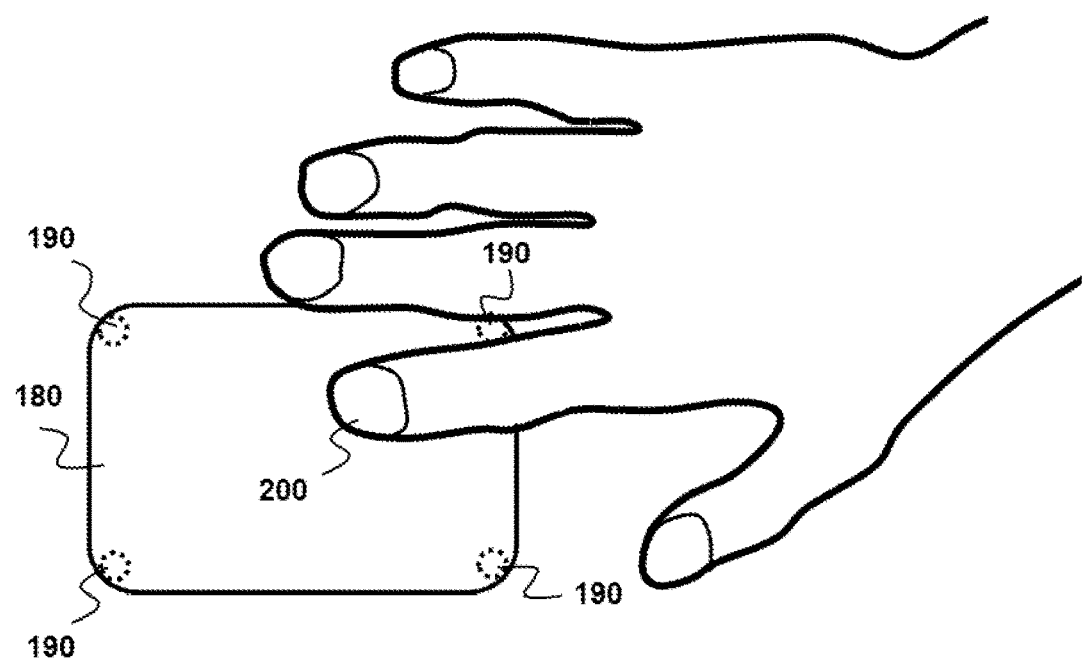
FIG. 7 illustrates four force sensors utilized in a touchpad to detect the point of touch between the touchpad and a user's finger, according to one embodiment of the present invention.

Overall, the concept of utilizing the force sensors can be implemented in various computer input devices. For example, FIG. 7 illustrates a touchpad comprised of a rectangular touch surface 180 where four force sensors 190 are positioned vertically beneath the four corners of the rectangular touch surface to be connected to a microprocessor. As shown in the figure, the user's finger touches the rectangular touch surface at a touch point 200, where the four force sensors provide the microprocessor with four signals that can be analyzed to compute the position of the touch point and the value of the vertical force.

The present touchpad has many advantages in comparison to the traditional touchpad. For example, the value of the vertical force can be utilized to represent the speed of moving objects on the computer display without utilizing additional buttons or using another finger. Moreover, in case of adding four force sensors to the boundary sides of the rectangular touch surface, as described previously, then the touchpad can detect the 3D direction of the exerted force which can be utilized to manipulate the objects to move in 3D on the computer display.

Figure 8:
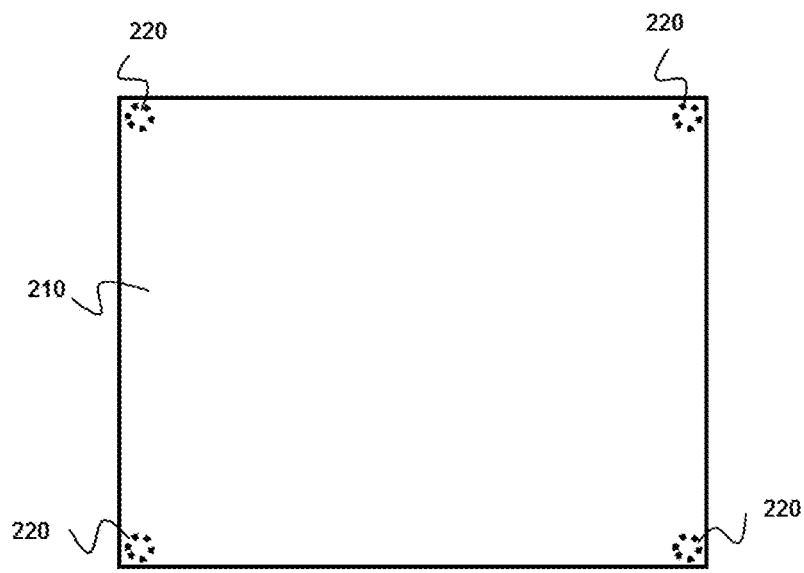
FIG. 8 illustrates four force sensors utilized in a touchscreen to detect the point of touch between the touchscreen and an object, according to one embodiment of the present invention.

FIG. 8 illustrates a portable touch screen comprised of a transparent sheet 210 which is a thin flexible sheet attached to four force sensors 220 at its four corners where the four sensors can be attached to the corners of a computer display and connected to the computer by a USB. When a user's finger touches the portable touch screen the transparent sheet compacts to exert tension forces on its four corners where the values of these tension forces are detected by the four force sensors, and provided to a microprocessor that computes the position of the user's finger along the transparent sheet. The portable touch screen is a unique computer input device that converts the traditional computer display into a touch screen in a fast and simple manner.

Figure 9:
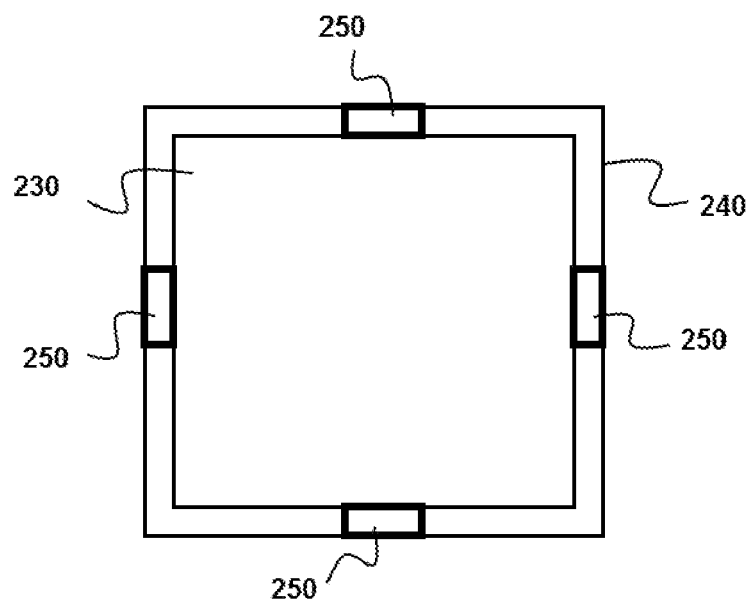
FIG. 9 illustrates four force sensors utilized in a computer mouse to detect the mouse movement on a surface, according to one embodiment of the present invention.

FIG. 9 is a top view of a computer mouse comprised of; a top chassis 230, a bottom chassis 240 and four force sensors 240 located between the top chassis and the bottom chassis of the mouse. The user's hand holds the top chassis to exert a horizontal force in a specific direction on the mouse without moving it on a desk or surface, where the four force sensors provide four signals to a microprocessor representing the exerted forces on the four sides of the bottom chassis. The microprocessor receives the signals from the four force sensors and provides the computer system with an immediate input representing the direction of the exerted force on the mouse which manipulates the objects to move in the same direction on the computer display. In this case the value of the exerted force can be utilized to control the speed of moving the objects on the computer display.

Figure 10:
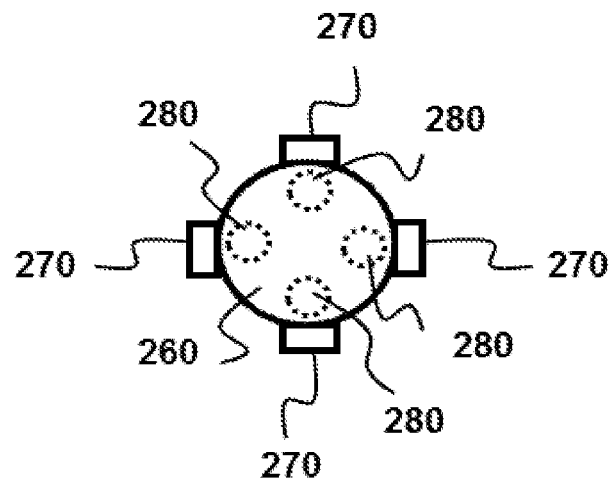
FIG. 10 illustrates eight force sensors utilized in a keyboard button to detect the three-dimensional direction of a finger touching the keyboard button, according to one embodiment of the present invention.

FIG. 10 illustrates a keyboard button 260 comprised of; a first group of four force sensors 270 positioned to face the side surface of the keyboard button, and a second group of four force sensors 280 positioned beneath the keyboard button. As described previously this configuration of force sensors enables such keyboard button to detect the direction of the exerted force from the finger on the keyboard button when typing. Each different direction of said exerted force can be interpreted to provide the computer system with a unique input or a keyboard shortcut using one button only.

Figure 11:
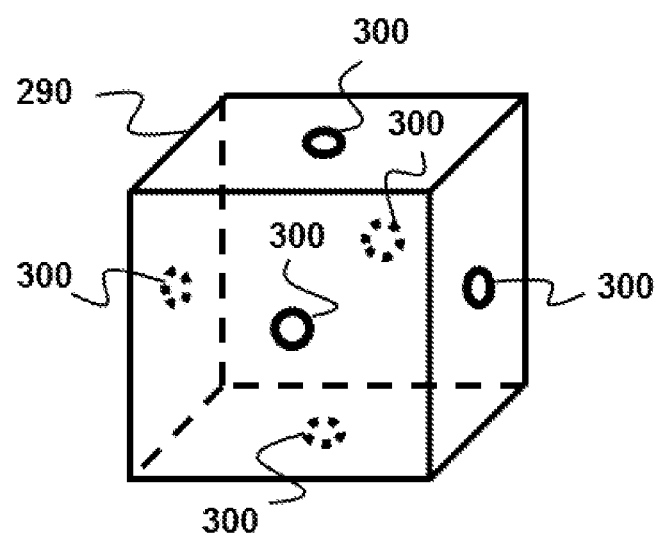
FIG. 11 illustrates six force sensors utilized with a cube to detect the point of touch, and the value and three-dimensional direction of a force exerted by a finger on the cube when the finger touches the cube.

The idea of using the force sensors can be implemented in various 3D computer input devices that enable the user to manipulate the objects to move in 3D on the computer display. For example, FIG. 11 illustrates a cube 290 where each one of its faces is connected to a force sensor 300 as shown in the figure. The cube can be moved slightly while the force sensors can not be moved from their positions, accordingly, when user pushes the cube in a 3D direction the output of the force sensors can be analyzed to compute this 3D direction. The direction of pushing the cube in 3D represents the same direction of moving the objects in 3D on the computer display.

Figure 12:
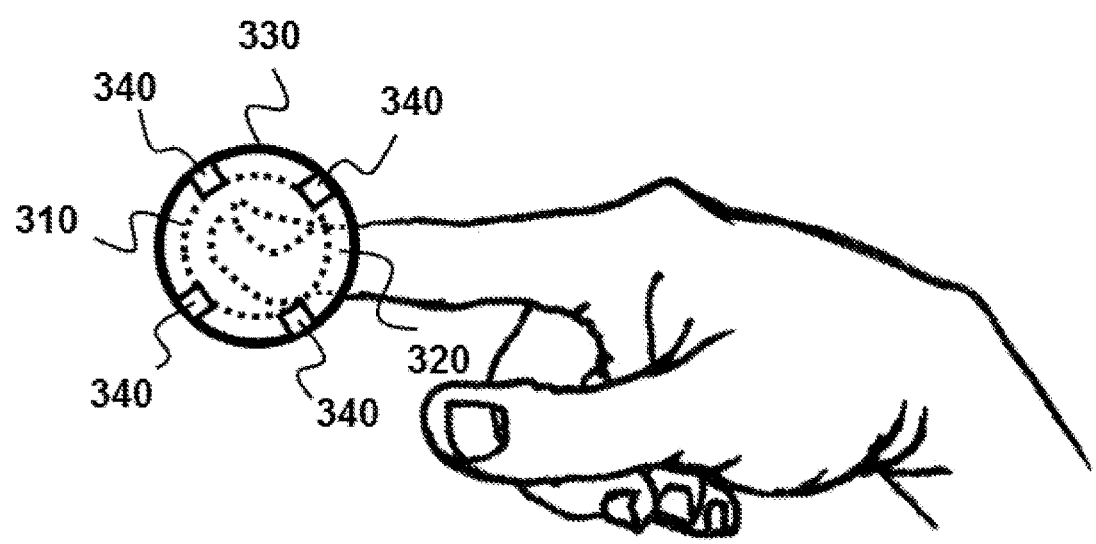
FIG. 12 illustrates six force sensors utilized with a sphere to detect the point of touch, and the value and three-dimensional direction of a force exerted by a finger positioned inside the sphere.

FIG. 12 illustrates another innovative 3D input device that looks like a 3D pointing stick comprised of an interior sphere, an exterior sphere, and six force sensors. The interior sphere 310 is a hallow sphere that has an opening 320 to enable the user to insert his/her finger inside it, where this interior sphere is filled with an elastic material such as rubber. The exterior sphere 330 is a hallow sphere surrounds the interior sphere and fixed to an object to prevent it form moving with the movement of the interior sphere. The six force sensors 340 are located between the interior sphere and the exterior sphere to detect the movement of the interior sphere with the finger movement in three dimensions. The direction of moving or rotating the finger along/about the x, y, or z-axis inside the interior sphere represents the same direction of moving or rotating the objects along/about the x, y, or z-axis on the computer display.

Overall, the main advantage of the present invention is utilizing an existing hardware technology that is simple and straightforward which easily and inexpensively carry out the present invention. For example, the force sensor can be a digital force sensor or an analog force sensor that detects the exerted force on its surface and generates a signal representing the value of this force. The two commercially available force sensors in the market are in the form of a push button and a fixable strip where both of them can be easily utilized with the present invention. The microprocessor receives the signal of the force sensors and provides the computer system with an immediate input representing a movement in two or three-dimensions on the computer display.

The algorithm of the present invention depends on structurally analyzing the output of the force sensors to compute the position, the value, and/or the direction of the force that is exerted form an object on the touch surface. Generally, as described previously the elements of the present invention has three different structural forms. The first structural form is illustrated in FIG. 1 where a vertical force is exerted on four vertical force sensors. The second structural form is illustrated in FIG. 3 where a horizontal force is exerted on four horizontal force sensors. The third structural form is illustrated in FIG. 5 where a force, that can analyzed into a vertical force and a horizontal force, is exerted on four vertical force sensors and four horizontal force sensors.

According to the structure analysis of the elements of FIG. 1 there are three unknown values and six known values. The three unknown values are the value of the vertical force, and x, and y, while the six known values are the four vertical reactions of the four sensors, and the length and width of the touch surface. Structurally analyzing the elements of FIG. 1 enables computing the three aforementioned unknown values. For example, the vertical force will be equal to the four reactions of the four force sensors, while the values of x and y can be obtained by solving two equilibrium equations of the vertical force and the four reactions of the four force sensors at any two corners of the touch surface. Generally, the following two equations represent the values of vertical force, and x and y;

$$Fv = R1 + R2 + R3 + R4$$

$$y = (0.5W - (LR2 + WR4 + (L^2 + W^2)^{0.5}R3)^2/2WFv^2) + (WR1 + LR3 + ((L^2 + W^2)^{0.5}R2)^2/2WFv^2$$

$$x = (((WR1 + LR3 + (L^2 + W^2)^{0.5}R2)^2/Fv^2) - y^2)^{0.5}$$

In the previous equations, "Fv" represents the value of the vertical force. R1 represents the reaction of the first force sensor that is located on the upper left corner, R2 represents the reaction of the second force sensor that is located on the upper right corner, R3 represents the reaction of the third force sensor that is located on the lower right corner, and R4 represents the reaction of the fourth force sensor that is located on the lower left corner of the touch surface. "x" and "y", respectively, represent the horizontal distance and the vertical distance of vertical force relative to the left bottom corner of the touch surface. "L" represents the length of the touch surface, and "W" represents the width of the touch surface.

According to the structure analysis of the elements of FIG. 3 there are two unknown values and six known values. The two unknown values are the value of the horizontal force, and its direction relative to the positive x-axis, and the four known values are the four horizontal reactions of the four force sensors. Structurally analyzing the elements of FIG. 3 enables computing the two aforementioned unknown values. For example, if the direction of the horizontal force is located between the first force sensor and the second force sensor then;

$$\tan \theta = R1/R2 \text{ and } Fh = R1/\sin \theta$$

If the direction of the horizontal force is located between the first force sensor and the fourth force sensor then;

$$\tan(\theta - 90) = R4/R1 \text{ and } Fh = R4/\sin(\theta - 90)$$

If the direction of the horizontal force is located between the third force sensor and the fourth force sensor then;

$$\tan(\theta - 180) = R3/R4 \text{ and } Fh = R3/\sin(\theta - 180)$$

If the direction of the horizontal force is located between the second force sensor and the third force sensor then;

$$\tan(\theta - 270) = R2/R3 \text{ and } Fh = R2/\sin(\theta - 270)$$

In the previous equations, "Fh" represents the value of the horizontal force. R1, R2, R3, and R4 represent the four reactions of the four force sensors that are, respectively, located at the top side, right side, bottom side, and left side of the touch surface, while θ represents the angle between the horizontal force and the positive of the x-axis.

According to the structure analysis of the elements of FIG. 5, the force 170 can be analyzed into a vertical force 130 and a horizontal force 160. The value of the vertical force and its position along the touch surface can be computed according to the previous equations of FIG. 1, while the value of the horizontal force and its direction relative to the positive x-axis can be computed according to the previous equations of FIG. 3. Knowing the value of the vertical force and the value of the horizontal force enables computing the value of "φ" which represents the direction of the force relative to the xy-plan according to the following equation;

$$\tan \phi = Fv/Fh$$

$$F = /\sin \phi$$

It is important to note that in case of using the portable touch screen of FIG. 8, the user's finger makes the transparent sheet compact to exert tension forces on the four force sensors that are attached to the corners of the transparent sheet instead of exerting compression forces on the four force sensors as the case of FIG. 1. Also when utilizing the cube and the six force sensors of FIG. 11, in this case the exerted force on the cube will be analyzed in three directions along the x, y, and z-axis instead of analyzing it in two direction only as the case of FIG. 3. This rule of analyzing the force in three directions along the x, y, or z-axis is also applied on the 3D pointing stick of FIG. 12.

It is also important to note that the touchpad of FIG. 7 and the portable touch screen of FIG. 8 can detect the position of one finger only. To enable the touchpad and the portable touch screen to detect the positions of more than one finger, in this case, the number of the force sensors is increased. Increasing the number of the force sensors increases the number of the known variables in the equilibrium equations which enables computing more unknown variables such as the positions of more than one force or finger.

Figure 13:
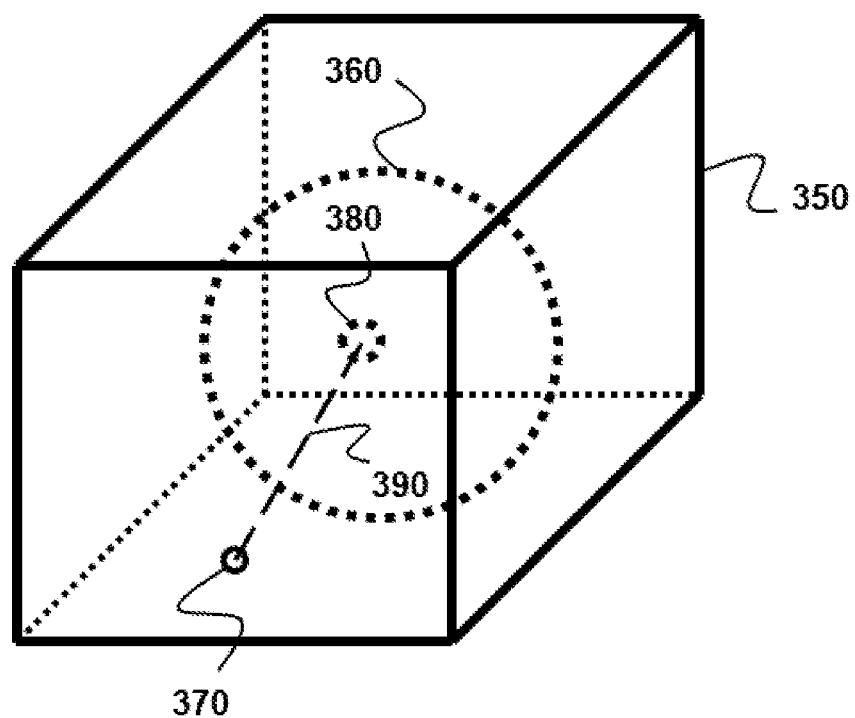
FIG. 13 illustrates a three-dimensional touchscreen in the form of a transparent cube with a real object or a sphere located inside the cube, with which the user can interact with the sphere though touching the cube.

Overall, one of the innovative utilization of the present invention is enabling the user to interact with real 3D objects using a three-dimensional touchscreen. For example, FIG. 13 illustrates a display system in the form of transparent cube 350, with a real object in the form of a ball 360 located inside the transparent cube. Touching any point on the exterior surface of the transparent cube leads to selecting a corresponding spot on the ball. As shown in the figure, a point 370 is touched by a user's finger that exerts a force on this point with a certain three-dimensional direction that leads to selecting a corresponding spot 380 on the ball. The dotted line 390, which illustrates a connection between the point and the corresponding spot, represents the three-dimensional direction of the force.

To achieve this, the transparent cube utilizes the force sensors to detect the location of the point of touch and the three-dimensional direction of the force exerted at the point of touch. To select the corresponding spot on the ball, a presentation unit is utilized. In one embodiment, the presentation unit comes in the form of a light beam that can be directed to the corresponding spot using a mechanical movement to rotate the source of the light beam towards the designated spot. The source of the light beam can be located inside or outside the ball. In another embodiment, the presentation unit comes in the form of a movement occurs at the corresponding spot. For example, the corresponding spot may be opened on the ball surface once the user selected it. The opening of the ball spots can be controlled by ON/OFF buttons located inside the ball, where each spot has a door controlled by its ON/OFF button.

In this case, a database stores the ID of each ON/OFF button of a spot associated with one or more points of touch and three-dimensional direction. In another embedment, the database stores the 3D model of the ball or real objects located inside or near the transparent cube. Once the position of the point of touch and the three-dimensional direction of the force are detected, the corresponding spot on the real object is determined. This is achieved by finding the intersection between the 3D model of the real objects and a line that starts at the point of touch with a direction and slope equal to the three-dimensional direction of the force.

Figure 14:
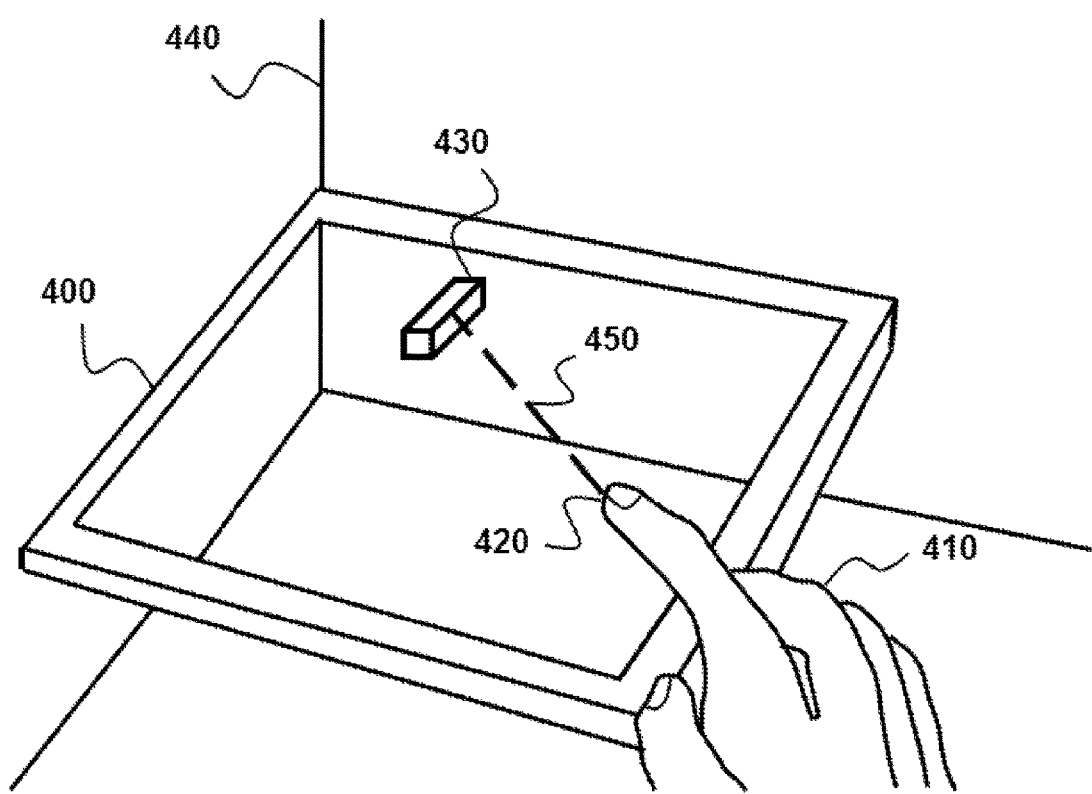
FIG. 14 illustrates a finger touching a transparent touchscreen at a point to select a real object from an environment located behind the transparent touchscreen.

The present invention of the display system is used among various mobile phones, tablets, and digital cameras touchscreen to enables the user to interact with real objects located in front of him/her. For example, FIG. 14 illustrates a tablet touchscreen 400 touched by a user's hand 410, at a point of touch 420, to select a real object 430 located in a real environment 440 located in front of the tablet camera. The dotted line 450 represents the three-dimensional direction of the force exerted from the user's finger on the touchscreen of the tablet. As shown in the figure, the dotted line illustrates the connection between the point of touch and the real object selected from the real environment. In this case, the presentation unit can be a light beam projected on the selected object. The source of the light beam can be attached to the tablet, or located away from the tablet. In either case, the source of the light beam is controlled by user's input to the tablet touchscreen.

Figure 15:
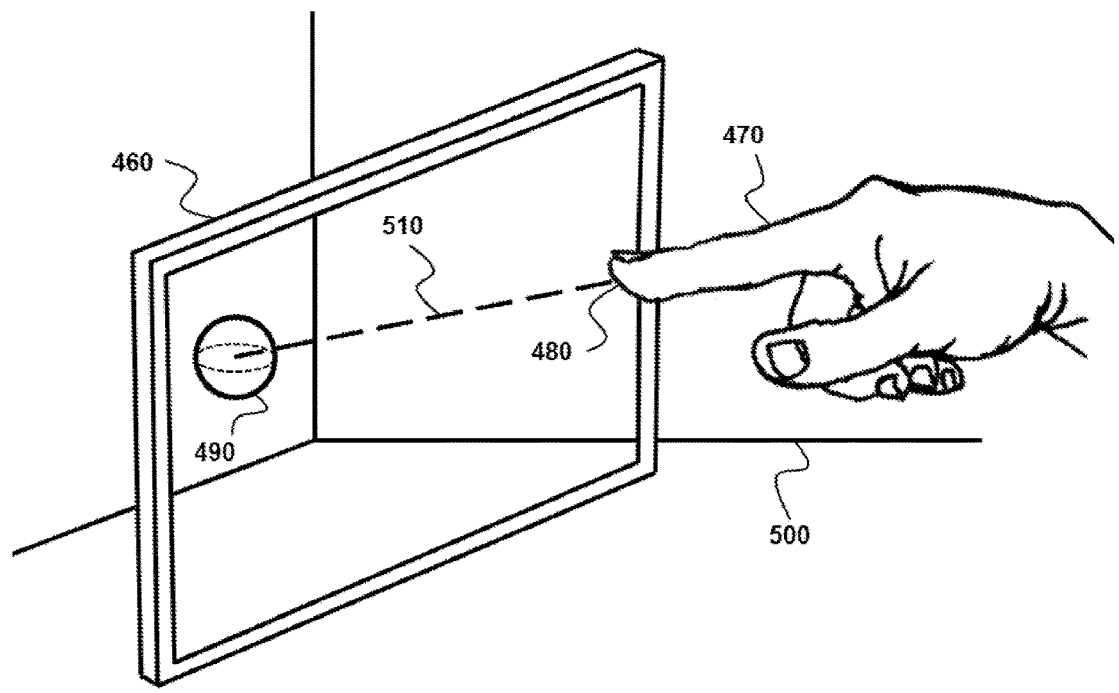
FIG. 15 illustrates a finger touching a digital camera screen to select a real object from an environment located in front of the digital camera screen.
Figure 16:
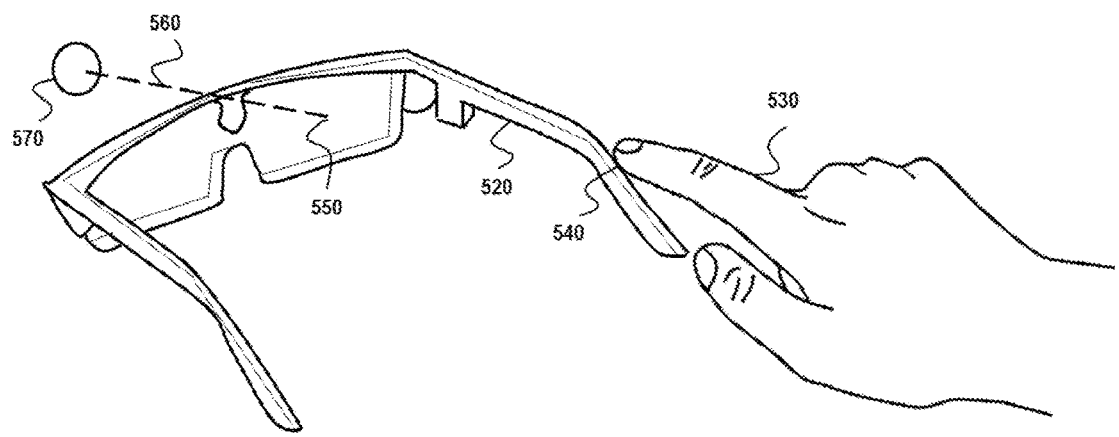
FIGS. 16 and 17 illustrate touching a frame of an eye glass with a force exerted in a three-dimensional direction to select an object located in front of the eye glass, in the same three-dimensional direction.

FIG. 15 illustrates a touchscreen 460 of a digital camera, touched by a finger 470 at a point 480 to select a real object 490 located in a real environment 500, in front of the digital camera. The dotted line 510 represents the three-dimensional direction of the force exerted by the finger on the touchscreen of the digital camera. It also illustrates the connection between the point of touch and the selected object. In this case, the presentation unit redirects the lens of the digital camera to zoom in on the selected object without the need to redirect or rotate the entire device towards the selected object.

The same concept of redirecting the camera lens according to the three-dimensional direction of a point of touch on a touchscreen can be utilized with HMDs. For example, 16 illustrates an HMD in the form of eye glasses such as GOOGLE GLASS, where the user can redirect the camera of the eye glasses by touching the frame 520 of the eye glasses with a finger 530 at any point, such as the point 540 illustrated in the figure. The three-dimensional direction of the force exerted by the finger at the point of touch represents an imaginary line extending from the center of the right eye glass 550 in the same three-dimensional direction of the force. As shown in the figure, the imaginary line is represented by a dotted line 560 to intersect with a real object 570 located in front of the user's eyes.

Capturing the scene in front of the camera after redirecting it with the user's touch, and projecting the picture of the scene on the eye glasses, enables the user to view the objects around him/her without turning his/her eyes or head. Using multiple cameras with the same eye glasses enables the capturing of entire scenes around the user with full user control of rotating the camera in any desired direction, towards the object that the user wishes to select.

Figure 17:
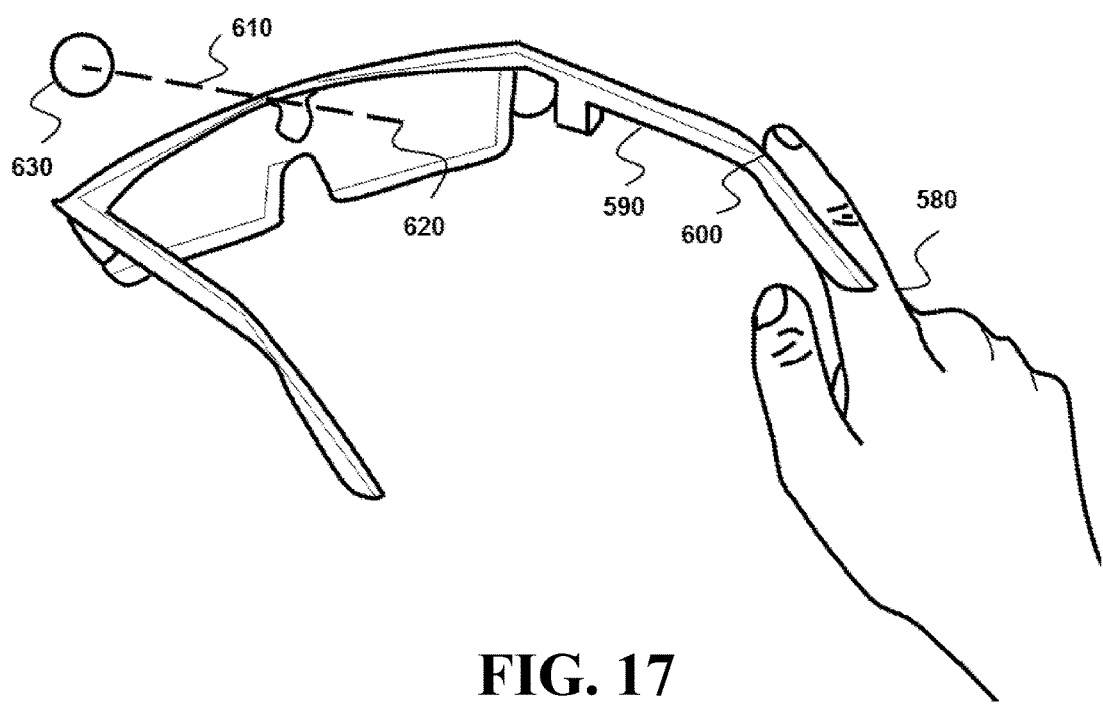

It is important to note that the same three-dimensional direction of the finger touch can be achieved by different configurations of the finger. For example, FIG. 17 illustrates the same finger 580 touching the same frame 590 of the eye glasses, at the same point of touch 600 of the previous example. The finger is taking a different configuration than shown in the previous example, but exerts a force with the same three-dimensional direction on the point of touch. Accordingly, the same imaginary line 610 is extended to connect the center of the right glass 620 with the same real object 630 located in front of the eye glasses. In this case, the frame of the eye glasses can be touched at any point with the user's finger to physically manipulate the camera of the eye glasses to rotate vertically or horizontally towards the selected object.

The previous example, of the HMD is an example of utilizing the present invention with objects that are of different shapes other than flat panels, cubes, or the like. However, to achieve this, the force sensors are positioned at each surface of the eye glasses frame and connected to a microprocessor that receives the signals of the force sensors to determine the point of touch and three-dimensional direction of the force touching the frame. These force sensors can be connected to various objects of different shapes, allowing for the utilization of the present invention in a variety of devices.

Overall, as discussed above, a three-dimensional touchscreen is disclosed, while a number of exemplary aspects and embodiments have been discussed above, those skilled in the art will recognize certain modifications, permutations, additions and sub-combinations thereof. It is therefore intended that claims hereafter introduced are interpreted to include all such modifications, permutations, additions and sub-combinations as are within their true spirit and scope.

The invention claimed is:

1. A display system that detects the point of touch and three-dimensional direction of a pressure exerted by an object on a surface to select a corresponding spot on a real object, wherein the display system is comprised of;
   a touching cube with six faces wherein each face of the six faces is a transparent surface and the real object can be seen through the transparent surface;
   a plurality of sensors wherein at least one sensor of the plurality of sensors is in touch with one face of the six faces to detect the value of the force exerted on the one face due to the pressure;
   a microprocessor that receives the output of the plurality of sensors to determine the point of touch and the three-dimensional direction;
   a database that associates each point of touch and three-dimensional direction with a corresponding spot on the real object; and
   a presentation unit that manipulates a camera to rotate horizontally or vertically according to the three-dimensional direction wherein the camera is a camera of a head mounted computer display and the surface is a surface of the head mounted computer display highlighting a spot on the real object corresponding to the point of touch and three-dimensional direction.

2. The display system of claim 1 wherein the real object is located inside the touching cube.

3. The display system of claim 1 wherein the touching cube is a panel that has a front face and back face.

4. The display system of claim 1 wherein the touching cube is a display of an electronic device such as a mobile phone, tablet, digital camera, or head-mounted computer display.

5. The display system of claim 1 wherein the touching cube is in the form of a frame of an eye glasses that functions as a head mounter computer display.

6. The display system of claim 1 wherein the touching cube is in the form other than a cube.

7. The display system of claim 1 wherein the plurality of sensors is a plurality of force sensors.

8. The display system of claim 1 wherein the database stores the three-dimensional model of the real object divided into a plurality of spots.

9. The display system of claim 1 wherein the presentation unit projects a light on the spot.

10. The display system of claim 1 further the presentation unit manipulates the spot to move.

11. The display system of claim 1 wherein the three-dimensional direction is represented by a first angle located between a face plane of the touching cube and a line representing the pressure, and a second angle located between the projection of the line on the face plane and the x-axis of the face plane.

12. The display system of claim 1 wherein the object is a hand finger.

13. The display system of claim 1 wherein the object is two or more hand fingers simultaneously applying the pressure.

14. The display system of claim 1 wherein the real object is located outside the touching cube.

15. The display system of claim 1 wherein the camera is a camera of an electronic device such as a mobile phone or tablet.

16. The display system of claim 1 wherein the camera is a virtual camera of a computer and the real object is a virtual object presented on the computer display.

17. The display system of claim 1 wherein the camera is a depth sensing camera that detects the distance between the camera and the exterior points of the real object.

18. The display system of claim 1 wherein each unique value of the pressure represents a different zoom of the camera.

* * * * *